United States Patent [19]

Jaeger

[11] Patent Number: 4,467,376
[45] Date of Patent: Aug. 21, 1984

[54] PROCESS FOR THE RECORDING ON, AND READING OF, STORE TAPES

[75] Inventor: Walter Jaeger, Cureglia, Switzerland

[73] Assignee: GX-Holding AG., Switzerland

[21] Appl. No.: 326,337

[22] Filed: Dec. 1, 1981

[30] Foreign Application Priority Data

Dec. 2, 1980 [CH] Switzerland ............... 8900/80

[51] Int. Cl.³ .................. G11B 5/08; G11B 15/60
[52] U.S. Cl. .................. 360/84; 360/130.23; 360/130.24
[58] Field of Search ........... 360/84, 85, 132, 81–83, 360/93, 8, 9, 130.22, 130.23, 130.24; 242/195

[56] References Cited

U.S. PATENT DOCUMENTS

| 3,588,378 | 6/1971 | Protas | 360/84 |
| 3,636,275 | 1/1972 | Sato | 360/130.24 |
| 4,050,090 | 9/1977 | Kollar | 360/130.23 |
| 4,122,506 | 10/1978 | Kubo | 360/130.23 |
| 4,170,787 | 10/1979 | Gunschmann | 360/130.23 |
| 4,179,717 | 12/1979 | Maxey | 360/84 |
| 4,213,162 | 7/1980 | Lemelson | 360/132 |
| 4,369,473 | 1/1983 | Eibensteiner | 360/85 |

Primary Examiner—Robert Martin Kilgore
Attorney, Agent, or Firm—Eric P. Schellin

[57] ABSTRACT

For recording on, and reading of, a magnetic tape guided around a cylinder, there are several magnet heads arranged on a common circle diameter. The magnet heads revolve about a common axis extending obliquely with respect to the travel direction of the tape. The magnet heads interact with the tape through a slot-shaped aperture formed in the cylinder.

For the purpose of achieving a very simple tape-guiding system, the tape is guided in a direction perpendicular to the cylinder longitudinal axis over a cylinder surface which, at least in its tape-guiding zone, and viewed in a section perpendicular to the cylinder longitudinal axis, corresponds at least approximately to a projection of the circular motion performed by the magnet heads in a direction perpendicular to the tape travel direction.

5 Claims, 4 Drawing Figures

PROCESS FOR THE RECORDING ON, AND READING OF, STORE TAPES

BACKGROUND OF THE INVENTION

The present invention relates to a process for the recording on, and reading of, a store tape guided around a cylinder, in particular a magnetic tape, by means of recording and reading heads which are arranged on a common circle diameter and which revolve about a common axis extending obliquely with respecct to the travel direction of the said tape, the arrangement being such that the said recording and reading heads interact with the tape through a slot-shaped aperture formed in the cylinder.

There are known methods of storing information, in particular pictorial information, on a magnetic tape. It has been found advantageous to effect the recoding on the magnetic tape by obliquely positioned information tracks. With a view to simplifying operation, it is desirable that the magnetic tape should be accommodated in a cassette and automatically threaded into the recoding or reading mechanism. This threading mechanism is inconveniently large, complicated and liable to trouble. Also, the tape is undesirably subject to elastic stress in the usual 180° envelopment as well as in transverse track recording.

SUMMARY OF THE INVENTION

The object of the present invention is to provide a process which does not have these disadvantages in that it permits small and simple cassettes to be used and results in an extremely simple threading process.

The said object is achieved according to the present invention by a process in which the tape is guided in a direction perpendicular to the cylinder longitudinal axis over a cylinder surface which, at least in its tape-guiding zone, and viewed in a section perpendicular to the cylinder longitudinal axis, corresponds at least approximately to a projection of the circular motion performed by the recording and reading heads in a direction perpendicular to the tape travel direction.

To permit a very small store unit to be used, the recording is preferably effected in a segmented manner. For this, it is an advantage to use four recording heads and four reading heads.

For simplicity in manufacture, it is expedient to approximate the elliptic tape-guiding zone by arc-of-circle sections.

Especially where very narrow tapes are used, it is an advantage to use a tape-guiding zone which is delmited by at least one guidance shoulder.

As it is not possible to use a rotating guide cylinder in the process claimed hereunder, it is expedient to give the tape-guiding zone a slight conicity, preferably less than 1°.

The process claimed hereunder permits the manufacture of very small store units. To permit the tape cassette also to be minimized in size, it is an advantage to make the arrangement such that where a magnetic tape is used as store tape and at least two recording and reading heads are used, the magnet gap of two consecutive recording or reading heads extends differently with respect to the revolution axis thereof.

BRIEF DESCRIPTION OF THE DRAWINGS

The present invention is now to be illustrated by way of example with reference to the drawing, in which.

DETAILED DESCRIPTION OF PREFERRED EMBODIMENTS

Figure 1:
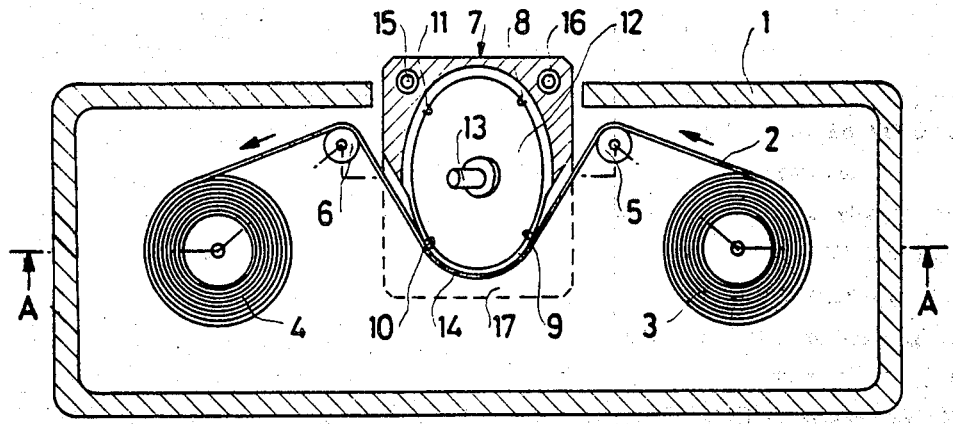
FIG. 1 is a plan view, on an enlarged scale, of an arrangement for the performance of the process claimed hereunder.
Figure 2:
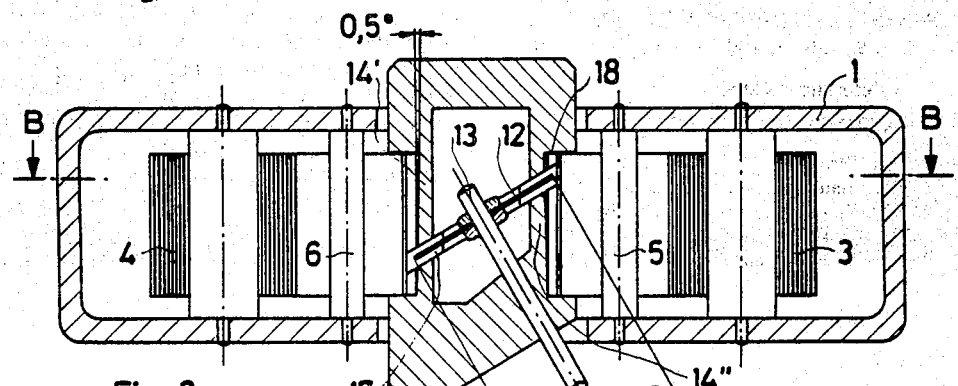
FIG. 2 is an elevation of the arrangement shown in FIG. 1.
Figure 2A:
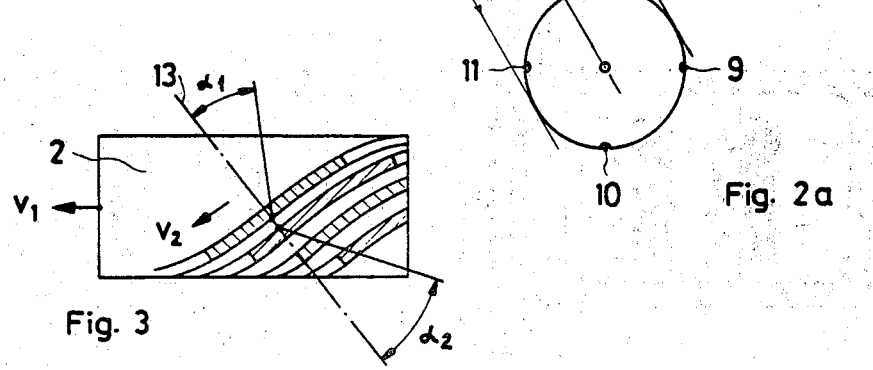
FIG. 2a is a view parallel to the revolution axis, vertically on to the disk provided with the magnet heads of the recording and reading mechanism.

As the drawing shows, a cassette case 1 contains a magnetic tape 2, which may, for example, correspond to a conventional magnetic tape used for audio signals. The magnetic tape 2 is on a supply spool 3 and is rewound on to a take-up spool 4. Inside the cassette case 1 are two guide spindles 5 and 6 to maintain the constant enveloping angle required.

For recording on, and reading of, the magnetic tape 2, the cassette case 1 with the guide spindles 5 and 6 is pressed so far against the recording and reading mechanism 7 that at any moment at least one of the four revolving heads 8,9,10,11 is in contact with the magnetic tape 2.

The four magnet heads 8,9,10,11 are secured to a disk 12 which carries them about the axis 13.

The unwinding and rewinding of the magnetic tape 2 as well as the drive of the four magnet heads 8,9,10,11 arranged on the disk 12 are effected in known, and therefore not represented, manner.

To ensure in recording and reading that the magnetic tape 2 is always uniformly scanned by the four revolving magnet heads 8,9,10,11 the tape 2 is guided by the cylinder 14, which has an elliptic shape in the tape-guiding zone and which, for the purpose of arranging the magnet heads 8,9,10,11 in its interior, is assembled from two cylinder halves 14' and 14" by means of two screws 15 and 16, and which presents a slot-shaped aperture 17 for the passage of the magnet heads 8,9,10,11.

In the process claimed hereunder, recording on the magnetic tape 2 is effected on the magnetic tape 2 which partly envelops an elliptic cylinder 14 in a direction perpendicular to the rotation axis 13 thereof, the arrangement being such that the cylinder 14 is obliquely intersected by a plane containing the revolving magnet heads 8,9,10,11.

Figure 3:
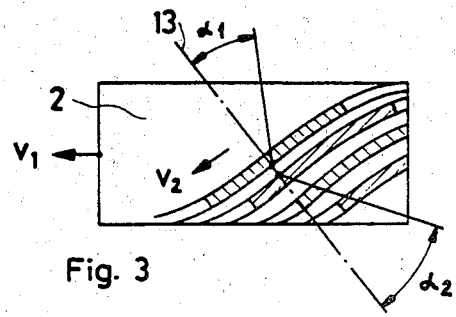
FIG. 3 is a representation of the track allignment on the stretched magnetic tape.

The resultant track alignment is shown in FIG. 3, where $v_1$ denotes the magnetic tape speed of, for example, 2 to 20 cm/sec, and $v_2$ deontes the magnet head speed of, for example, 4 to 20 meters/sec.

Contrary to the known processes, the process claimed hereunder produces no straight-line tracks, although the speeds of tape and magnet head are constant throughout the recording and reproduction operations.

To prevent adjacent tracks from causing overlap through their curvature and variable track distance, it is expedient to make the arrangement such that the magnet gap of two consecutive recording or reading heads extends differently with respect to the revolution axis 13 thereof, that is, at the angles $\alpha_1$ and $\alpha_2$, respectively.

To make the drawing clear, the width of the magnetic tape 2 is exaggerated in relation to the other portions of the drawing, so that the obliquity of the rotation axis 13 also appears exaggerated.

Only by virtue of the elliptic tape-guiding zone is it possible to arrange the spools 3 and 4 in the same plane and to guide the tape 2 around the recording and reading mechanism 7 without deformation.

Where a magnetic tape is used, the recording and reading heads are combined into a single magnet head, and in addition erasing heads are provided. With the same process, recording on a tape with a laser arrangement is conceivable.

I claim:

1. Apparatus for the recording on, and reading of, a magnetic tape comprising:

recording and reading heads which are arranged on a disk which revolves around a common axis extending obliquely with respect to the travel direction of said tape, tape transport means; and guiding means of elliptical cylindrical form having major and minor elliptical axis and longitudinal axis, with guiding means surrounding said recording heads, said longitudinal axis being perpendicular to the direction of tape transport, said recording and reading heads interacting with the tape through a slot-shaped aperture provided in said guiding means.

2. Apparatus according to claim 1 in which four recording heads and four reading heads are provided.

3. Apparatus according to claim 1 or 2 in which said tape guiding means has its elliptical cross-sectional form approximated by a multiplicity of arc-of-circle sections.

4. Apparatus according to claim 1 in which the longitudinal axis of said guiding means departs from perpendicular to the direction of tape transport by less than 1°.

5. Apparatus according to claim 1 in which consecutive recording or reading heads have gaps formed at different angles with respect to the axis of rotation of said disk.

* * * * *